W. B. HAIGH.
WOOD MORTISING MACHINE.
APPLICATION FILED SEPT. 1, 1910.

987,065.

Patented Mar. 14, 1911.
2 SHEETS—SHEET 2.

WITNESSES
W. P. Burk
John C. Sanders

INVENTOR
William B. Haigh
By Wallace White
ATTY.

UNITED STATES PATENT OFFICE.

WILLIAM BLACKETT HAIGH, OF OLDHAM, ENGLAND, ASSIGNOR TO OLIVER MACHINERY COMPANY, LIMITED, OF MANCHESTER, ENGLAND.

WOOD-MORTISING MACHINE.

987,065.  Specification of Letters Patent.  Patented Mar. 14, 1911.

Application filed September 1, 1910. Serial No. 580,049.

*To all whom it may concern:*

Be it known that I, WILLIAM BLACKETT HAIGH, of 39 Barker street, Oldham, in the county of Lancaster, England, engineer, have invented new and useful Improvements in Wood-Mortising Machines, of which the following is a specification.

This invention relates to wood mortising machines and particularly to chain mortising machines and has for its object to provide an improved driving arrangement for the cutter chain which shall obviate the employment of toothed gearing and shall insure an efficient driving connection between the driving and driven elements at all times.

A further object of my invention is to combine with said driving connection, improved means for producing tapered mortises and for positively raising and lowering the slide carrying the cutter chain for adapting the machine to work upon varying dimensions of material.

My invention comprises the improved combinations and arrangements of parts hereinafter described and claimed.

Figure 1:
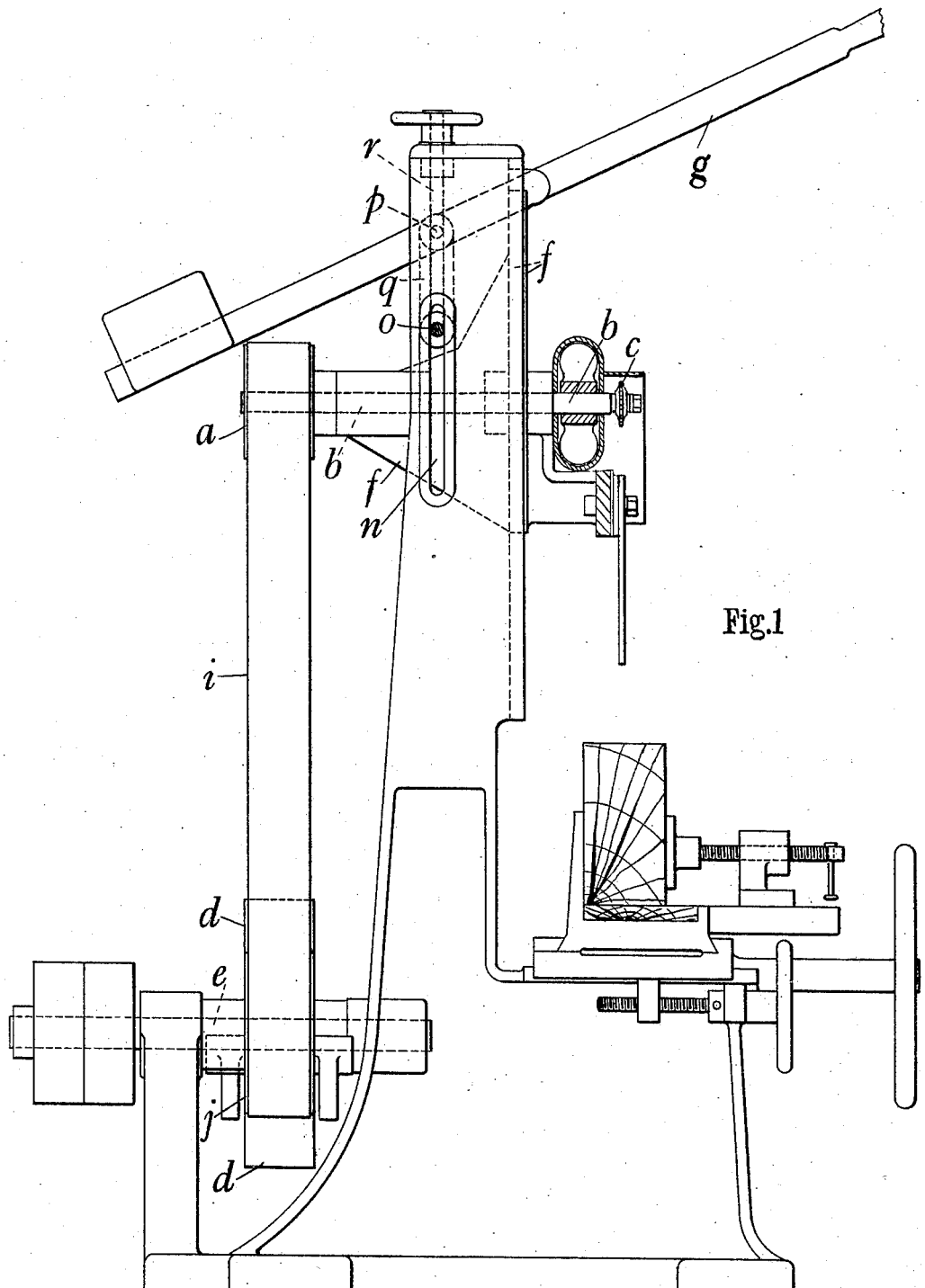
Figures 2, 3:
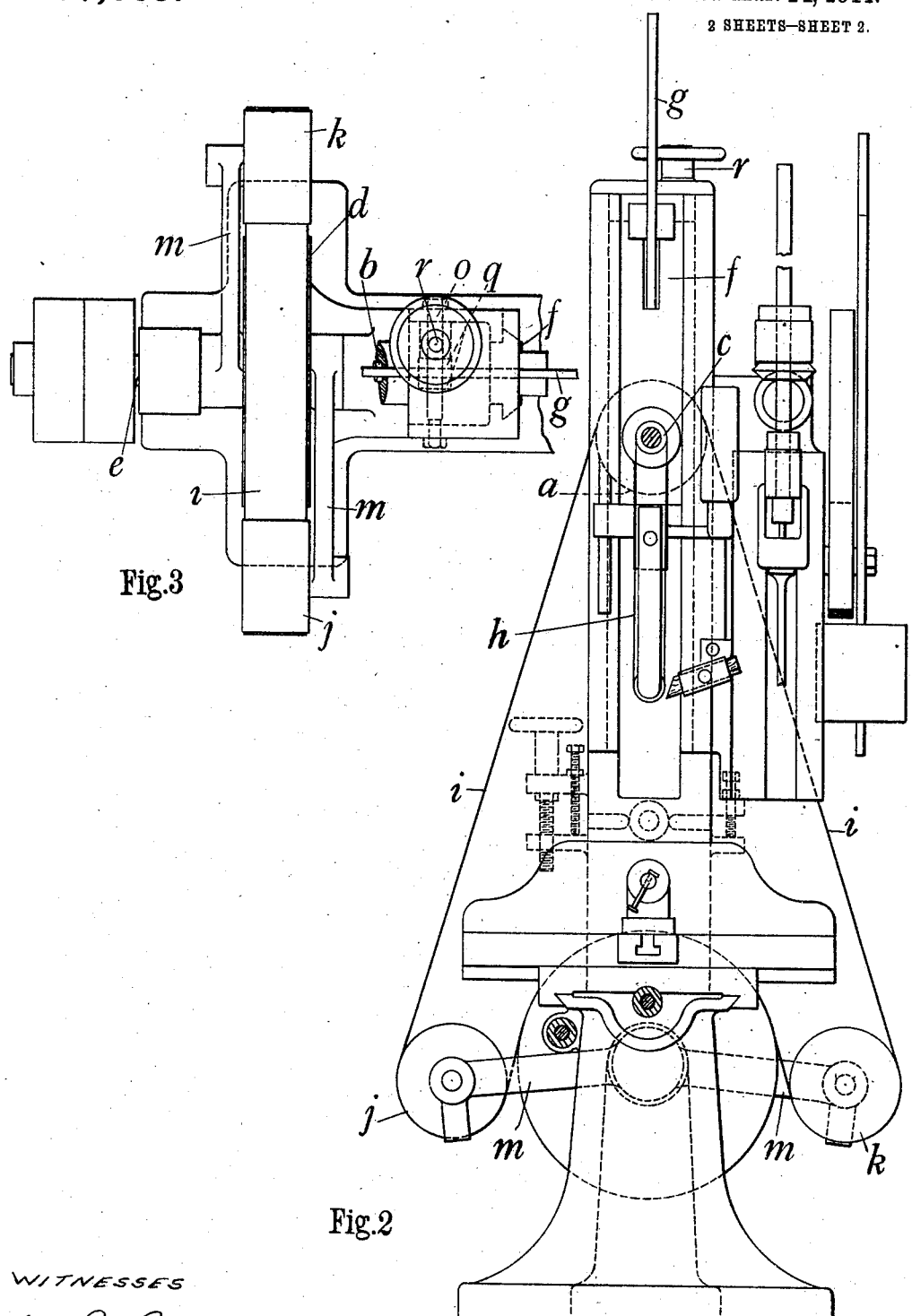

Referring to the accompanying sheet of explanatory drawings:—Figure 1 is an end elevation, Fig. 2 a front elevation and Fig. 3 a plan view, partly in section, of a mortising machine constructed and arranged in accordance with my invention.

The same reference letters in the three views indicate the same parts.

I provide a belt or rope pulley $a$ upon the shaft or spindle $b$ which carries the chain driving wheel or sprocket $c$, and I provide a similar pulley $d$ upon the power shaft $e$ of the machine, situated at the lower end of the latter. The shaft $b$ with its driving pulley $a$ and sprocket wheel $c$, are supported in a slide $f$ operated by the handle $g$ as the cutter chain $h$ is fed into or withdrawn from its work, in the ordinary manner.

To drive the cutter chain pulley $a$ from the pulley $d$ upon the power shaft $e$, I provide a belt $i$ which passes over both pulleys and under two jockey pulleys $j$ and $k$, the latter being situated one at each side of the pulley $d$ as shown, and being carried by radial arms $m$ fulcrumed upon the shaft $e$.

With the arrangement aforesaid, as the cutter chain driving pulley $a$ falls, the jockey pulleys $j$ and $k$ will fulcrum about the power shaft $e$ and take up any slack in the driving belt or rope. I may provide means for varying the downward pressure of the pulleys $j$ and $k$ upon the belt $i$.

By the arrangement of the jockey pulleys $j$ and $k$ at each side of the power pulley and by passing the driving belt or rope over the latter and under the jockey pulleys, I insure that as the cutter chain $h$ is fed forward into its work and the jockey pulleys fall, the driving belt has a greater arc of contact with the driving pulley $d$ and with the driven pulley $a$ so preventing any slipping of the belt when the cutter chain is in action.

To provide for the permanent raising or lowering of the slide $f$ carrying the cutter chain $h$, to suit varying dimensions of wood being operated upon, I allow for the raising or lowering of the fulcrum of the hand operated lever $g$ which is secured to and actuates the said slide. In one convenient form, I provide slots $n$ in each side of the framework of the machine in which a bolt as $o$ or a slide, extending across the machine, can be secured at any convenient position. The fulcrum pin $p$ of the hand lever $g$ aforesaid is secured to said bolt $o$ by two links $q$. When it is desired to alter the position of said fulcrum pin $p$ for raising or lowering the slide $f$, it is only necessary to raise or lower the bolt $o$ in the slots $n$, the jockey pulleys $j$ and $k$ compensating for any movement of the chain driving pulley $a$ relatively to the fixed pulley $d$ upon the power shaft $e$. The aforesaid movement of the bolt $o$ in the slots $n$, may be produced by means of the screw $r$ as shown.

To enable my machine to produce tapered mortises, I may pivot the upper portion of the framework, carrying the cutter chain and its driving gear, about the lower portion so that the cutter chain can be worked at an angle to the vertical. This arrangement is shown by dotted lines at Fig. 2.

By the employment of my invention, I am enabled to produce a simple and effective driving arrangement for a chain mortising machine which does not occupy much room and which readily adjusts itself to compensate for any movements of the slide $f$ due to the variations in the height of the fulcrum of the hand lever $g$ or to movements of the latter for feeding the cutter chain $h$ into or withdrawing it from its work.

Having now described my invention what

I claim as new and desire to secure by Letters Patent is:—

1. In wood mortising machines, in combination, a mortise chain, a shaft driving said chain, a pulley upon said shaft, a power shaft, a pulley upon said power shaft, two jockey pulleys one at each side of said pulley upon the power shaft, a flexible driving connection passing over the pulleys on the chain driving and mortise shafts and under the jockey pulleys, and means causing said jockey pulleys to increase the arc of contact of said flexible driving connection with the pulleys over which it passes as the mortise chain is fed downward, as set forth.

2. In wood mortising machines, in combination, a mortise chain, a shaft actuating said chain, a driven pulley upon said shaft, a power shaft, a driving pulley upon said shaft, two radial arms fulcrumed about the power shaft, two jockey pulleys mounted upon said radial arms one at each side of said power shaft, and a flexible driving connection passing over said driving and driven pulleys and under said jockey pulleys, as set forth.

3. In wood mortising machines, in combination, a mortise chain, a shaft driving said chain, a slide carrying said shaft, a hand operated lever secured to said slide, means for varying the height of the fulcrum point of said lever, a driven pulley mounted upon said shaft, a power shaft, a driving pulley upon said shaft, two radial arms fulcrumed about the power shaft, two jockey pulleys mounted upon said radial arms one at each side of said power shaft, and a flexible driving connection passing over said driving and driven pulleys and under said jockey pulleys, as set forth.

4. In wood mortising machines, in combination, a frame, a slide working in the upper portion of said frame, a hand operated lever secured to said slide, means for varying the height of said hand operated lever, means for varying the angular position of the upper portion of said frame, a shaft carried by the slide, a mortise chain actuated by said shaft, a driven pulley upon said shaft, a power shaft, a driving pulley upon said shaft, two radial arms fulcrumed about the power shaft, two jockey pulleys mounted upon said radial arms one at each side of the power shaft, and a flexible driving connection passing over said driving and driven pulleys and under said jockey pulleys, as set forth.

In testimony whereof I have signed my name to this specification in the presence of two subscribing witnesses.

WILLIAM BLACKETT HAIGH.

Witnesses:
ARTHUR HUGHES,
CHARLES CONRAD.

---

Copies of this patent may be obtained for five cents each, by addressing the "Commissioner of Patents, Washington, D. C."